US007216333B2

(12) United States Patent
Neuenhofen

(10) Patent No.: US 7,216,333 B2
(45) Date of Patent: May 8, 2007

(54) FINGERPRINT SUBTYPE CHECKING

(75) Inventor: Kay A. Neuenhofen, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 770 days.

(21) Appl. No.: 10/410,020

(22) Filed: Apr. 8, 2003

(65) Prior Publication Data

US 2004/0205750 A1    Oct. 14, 2004

(51) Int. Cl.
*G06F 9/44* (2006.01)
(52) U.S. Cl. ........................... 717/108; 717/116
(58) Field of Classification Search ............... 717/126, 717/116, 108
See application file for complete search history.

(56) References Cited

U.S. PATENT DOCUMENTS 5,267,349 A * 11/1993 Barabash et al. ............. 706/53
2003/0061230 A1 * 3/2003 Li ........................... 707/103 R
2003/0188295 A1 * 10/2003 Adl-Tabatabai et al. .... 717/126

OTHER PUBLICATIONS

Cliff Click, John Rose, "Fast subtype checking in the HotSpot JVM", Nov. 2002, Proceedings of the 2002 joint ACM-ISCOPE conference on Java Grandep. p. 96-103.*
Bruce et al., "Safe and decidable type checking in an object-oriented language", Oct. 1993, ACM SIGPLAN Notices, Proceedings of the eigth annual conference on Object-oriented programming systems, languages, and applications OOPSLA '93, vol. 28 Issue 10, p. 29-46.*
Vitek et al., "Efficient type inclusion tests", Oct. 1997, ACM SIGPLAN Notices, Proceedings of the 12th ACM SIGPLAN conference on Object-oriented programming, systems, languages, and applications OOPSLA '97, vol. 32 Issue 10, p. 142-157.*

* cited by examiner

*Primary Examiner*—Wei Zhen
*Assistant Examiner*—Philip Wang
(74) *Attorney, Agent, or Firm*—Gunnison, McKay & Hodgson, L.L.P.; Philip J. McKay

(57) ABSTRACT

One or more fingerprints may be utilized in each class in order to allow for faster subtype checking. A subclass fingerprint may be utilized to track the superclasses of a class, and an interface fingerprint may be utilized to track the locally declared interfaces of the class and any interfaces which it inherits. This allows for subtype checking that is extremely fast and efficient by utilizing comparison and other logical operations during the checking.

24 Claims, 13 Drawing Sheets

FINGERPRINT SUBTYPE CHECKING

FIELD OF THE INVENTION

The present invention relates to the field of software virtual machines. More particularly, the present invention relates to checking whether a class in a virtual machine is a subclass of another class by using a subtype fingerprint.

BACKGROUND OF THE INVENTION

A virtual machine is software that acts as an interface between compiler code and a hardware platform. Once a virtual machine has been provided for a platform, any compatible program can run on that platform without necessitating hardware-specific alterations. When running a virtual machine, one or more classes and interfaces may be loaded. A class is a template definition of the methods and variables in a particular kind of object. An interface is a reference type whose members are constants and abstract methods.

Some of the program commands in a virtual machine, also called bytecodes, need to check whether the class of a particular instance is a subclass of another class, or implements a particular interface. In the Java™ Virtual Machine created by Sun Microsystems, Inc. of Palo Alto, Calif., these bytecodes are aastore, checkcast, and instance of.

The hierarchy of classes in a virtual machine may be thought of as a tree structure. Therefore, one way to implement this checking is to begin at the node representing the class being checked, and walk up the hierarchy until the possible superclass or interface is found or the root of the class hierarchy is reached.

This approach, however, can be slow in many cases. There are presently two optimization techniques that may be used to speed up this approach, but as will be seen they each suffer their own drawbacks. The first technique, known as subtype caching, is to put the subclass into a cache for the superclass' subtype when a superclass of the subclass is found. While this speeds up the search when a matching superclass is found, caching does not occur when the subtype check fails. Additionally, when a class or interface is tested against more than two subclasses (the currently implemented cache size), the cache will constantly be trashed.

The second technique, known as subtype matrix generation, involves creating a matrix that stores information regarding the relationships between the classes. While this approach is fast, it requires $n^2$ space for the matrix, where n is the number of classes in the system. This results in wasted memory space. Additionally, classes and interfaces need to know their index for the matrix lookup.

What is needed is a technique that allows for fast subtype checking in an efficient manner.

BRIEF DESCRIPTION

One or more fingerprints may be utilized in each class in order to allow for faster subtype checking. A subclass fingerprint may be utilized to track the superclasses of a class, and an interface fingerprint may be utilized to track the locally declared interfaces of the class and any interfaces which it inherits. This allows for subtype checking that is extremely fast and efficient by utilizing comparison and other logical operations during the checking.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
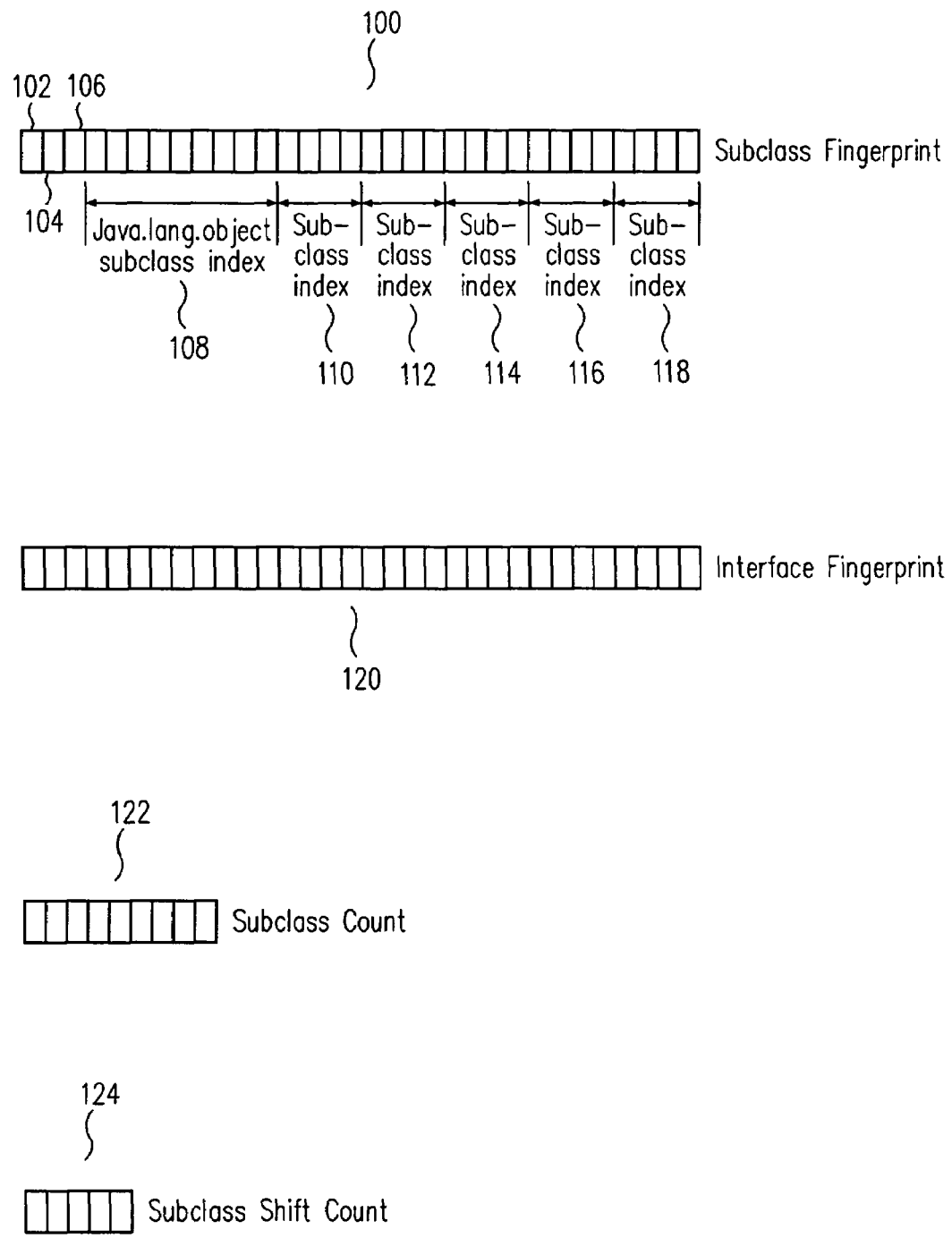
FIG. 1 is a diagram illustrating the various data structures that may be utilized by the fingerprinting technique.

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

It should also be noted that specific embodiments are described where bit-level operations are performed. The term "bit" in the present invention is merely used as an example of one size of memory location that may be utilized. One of ordinary skill in the art will recognize that other sized memory locations may also be utilized.

The present invention utilizes one or more fingerprints in each class. Upon class creation, the fingerprint may also be created based on the fingerprint of the class or instance that the new class depends from. This allows for subtype checking that is extremely fast and efficient.

In an embodiment of the present invention, two kinds of fingerprints are utilized: a subclass fingerprint and an interface fingerprint. For classes, the subclass fingerprint may be a numeric representation of its position in the class hierarchy, and the interface fingerprint may be a list of the implemented interfaces. For interfaces, the subclass fingerprint may be unused, and the interface fingerprint may be equal to the index of the interface. Both these fingerprints may be initialized at class loading time.

FIG. 1 is a diagram illustrating the various data structures that may be utilized by the fingerprinting technique. It should be noted that the sizes and organizations of these data structures should not be limited to the sizes and organizations depicted in the figures. One of ordinary skill in the art will recognize that these are only examples and may be modified while still maintaining the goals of the present invention. Additionally, each of these data structures themselves may be viewed as optional. For example, the use of just a subclass fingerprint and not the other data structures would still result in improved subtype checking.

A 32-bit subclass fingerprint 100 may comprise several fields. A first field 102 may be unused. An object array flag 104 may be set if the class is an object array. As will be seen, such classes require special handling in that a match should only be found if both the subclass and the superclass are object arrays (and the other conditions for a match are found). A type array flag 106 may be set if the class is a type array. As with the object array, a match should only be found if both the subclass and the superclass are type arrays (and the other conditions for a match are found).

A java.lang.Object subclass index 108 may be utilized to handle the typical virtual machine hierarchy. In practice, the java.lang.object typically has the largest number of classes depending from it of any of the superclasses in the virtual machine. Since as will be seen later, the index is a unique value based on the number of subclasses already existing that are directly depending from the superclass, an oversized index field is utilized for the java.lang.object lest there not be enough unique values due to the large number of classes directly dependent from java.lang.object.

Five groups of 4-bit subclasses indices 110, 112, 114, 116, 118 may be used to represent five levels of fingerprints. Thus, with the java.lang.Object index, this embodiment has the ability to track up to 6 levels of hierarchy.

A 32-bit interface 120 fingerprint may keep track of the interfaces that are either directly referenced by the current class, or directly referenced by a superclass of the current class. Each interface may have a globally unique index value, and that index value may be multiplied by a binary "2" (i.e., shifted one towards the most significant bit) in between each interface index value. Thus, the first globally declared interface index may have a binary value of "1", while the second has "10", and the third "100", etc. This allows the 32-bit interface to track up to 32 different globally declared interfaces. In an interface, the interface fingerprint tracks this global value.

A 9-bit subclass count 122 may be used to index the particular subclass correctly. The count may keep track of how many subclasses a class has. For these purposes, a subclass would be a direct descendant (e.g., a child), and not a distant descendant (e.g., a grandchild).

A 5-bit subclass shift count 124 may be used to track the number of how many shifts are needed to correct for the level of depth of the subclass. This will be described in more detail later.

During class loading, there is a difference in treatment between simple classes, type array classes, object array classes, and interfaces. For simplicity, each of these cases will be discussed individually. However, one of ordinary skill in the art will recognize they could be combined with an additional step that determines the appropriate case and applies the correct method.

Figure 2:
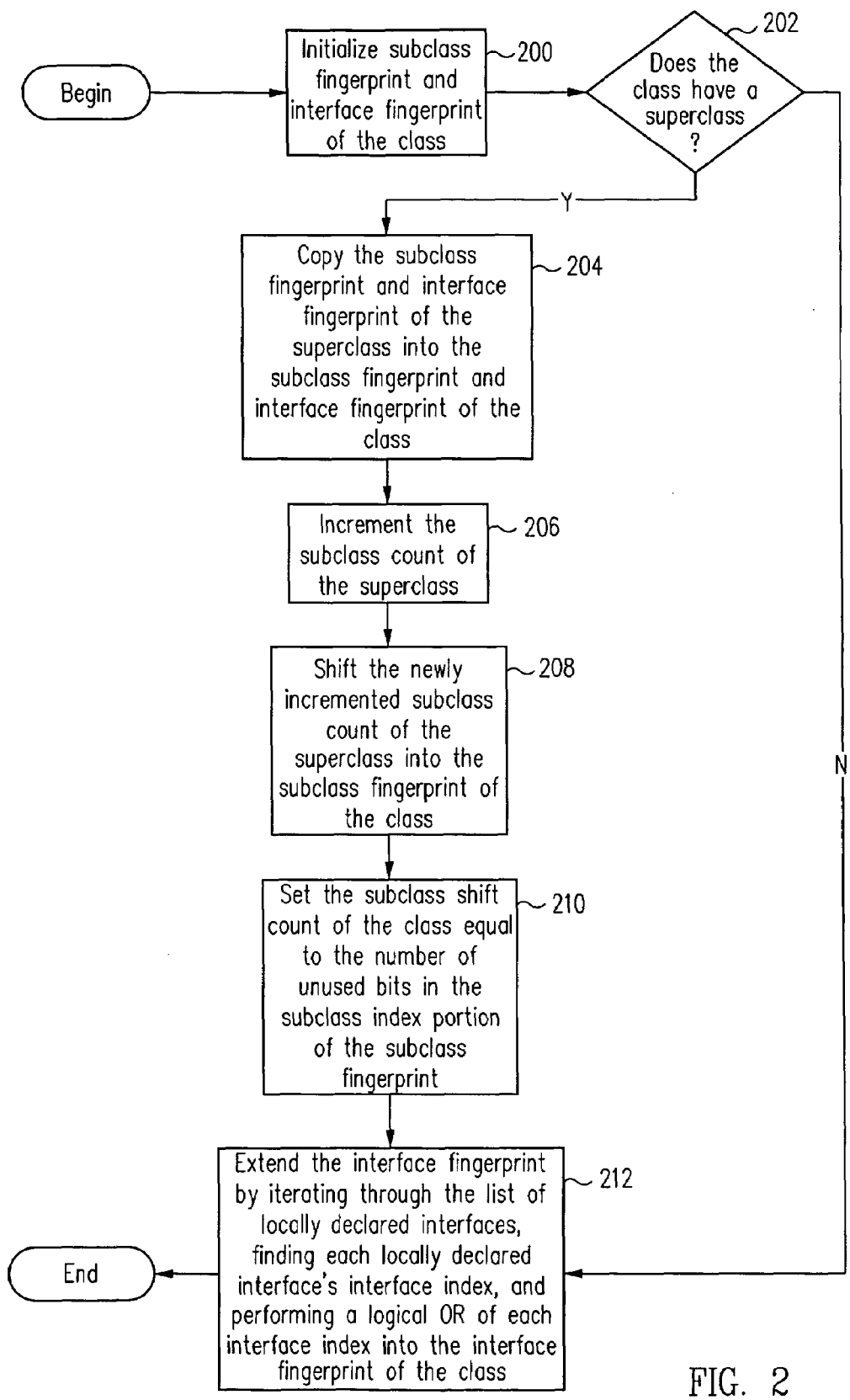
FIG. 2 is a flow diagram illustrating a method for loading a simple class in a virtual machine in accordance with an embodiment of the present invention.

FIG. 2 is a flow diagram illustrating a method for loading a simple class in a virtual machine in accordance with an embodiment of the present invention. At 200, the subclass fingerprint and interface fingerprint may be initialized to all zeros. At 202, it may be determined if the class has a superclass (i.e., if the class is not the root class). If, on the other hand, it does have a superclass, then at 204 the subclass fingerprint and interface fingerprint of the superclass may be copied into the subclass fingerprint and interface fingerprint of the class. Then, at 206, the subclass count of the superclass may be incremented. At 208, the newly incremented subclass count of the superclass may be shifted into the subclass fingerprint of the class. In one embodiment, if the superclass is java.lang.Object, then there is no need to shift per se as a java.lang.Object index is available for direct copying of the newly incremented subclass count. In the embodiment described in FIG. 1 and the accompanying text, if the superclass is not java.lang.Object, the shifting involves finding the first empty index field and then performing an OR operation with the subclass count of the superclass into that empty index field. The number of bits may be fixed according to how the subclass fingerprint is organized. The first empty subclass index field may be determined by comparing a bit mask that is the same size as each index field (e.g., four bits) and performing an AND operation between the bit mask and the first index field. This may require that the bit mask be shifted down by the size of the index field (e.g., four bits) each time this comparison is made. If the result is zero, then the index field is empty. If not, the AND operation may be repeated with the next index field. This may continue until an empty index field is found or there are no more index fields. If the latter occurs, the fingerprint may be initialized to a special value, such as 0xffffffff.

At 210, the subclass shift count of the class may be set equal to the number of unused bits in the subclass index portion of the subclass fingerprint. At 212, the interface fingerprint may be extended by iterating through the list of locally declared interfaces, finding each's interface index, and performing a logical OR of each interface index into the interface. fingerprint.

Figure 3:
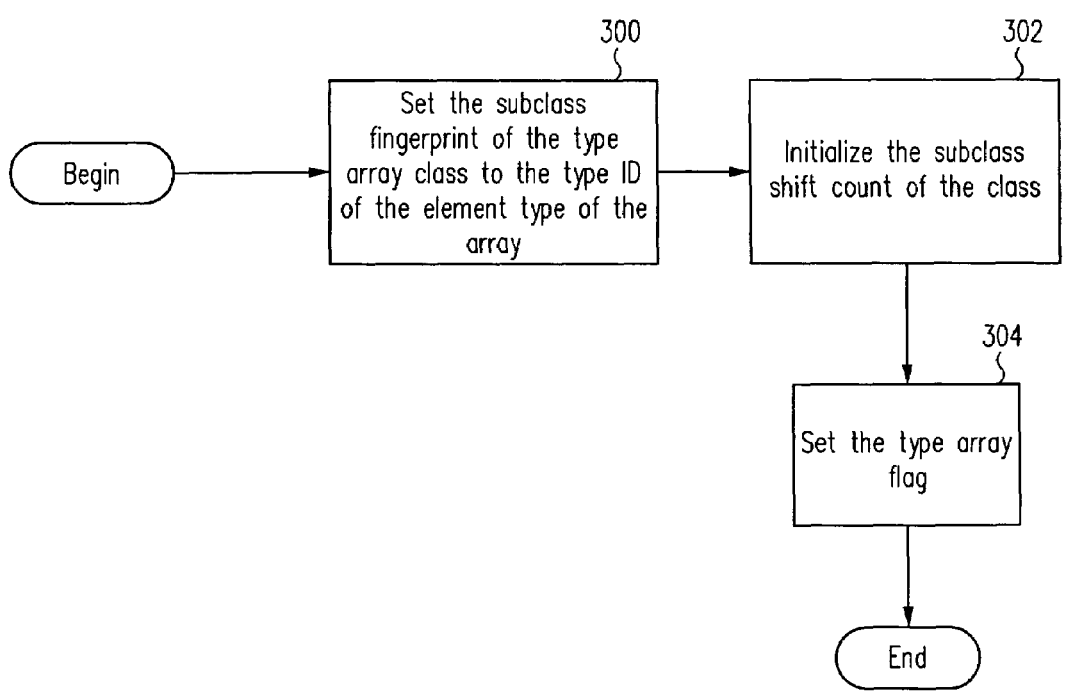
FIG. 3 is a flow diagram illustrating a method for loading a type array class in accordance with an embodiment of the present invention.

FIG. 3 is a flow diagram illustrating a method for loading a type array class in accordance with an embodiment of the present invention. At 300, the subclass fingerprint of the class may be set to the type id of the element type of the array. Each primitive variable type (e.g., integer, floating point, etc.) has a unique type id, and this may be used as the subclass fingerprint. At 302, the subclass shift count of the type array class may be initialized to zero. Then at 304, the type array flag may be set.

Figure 4:
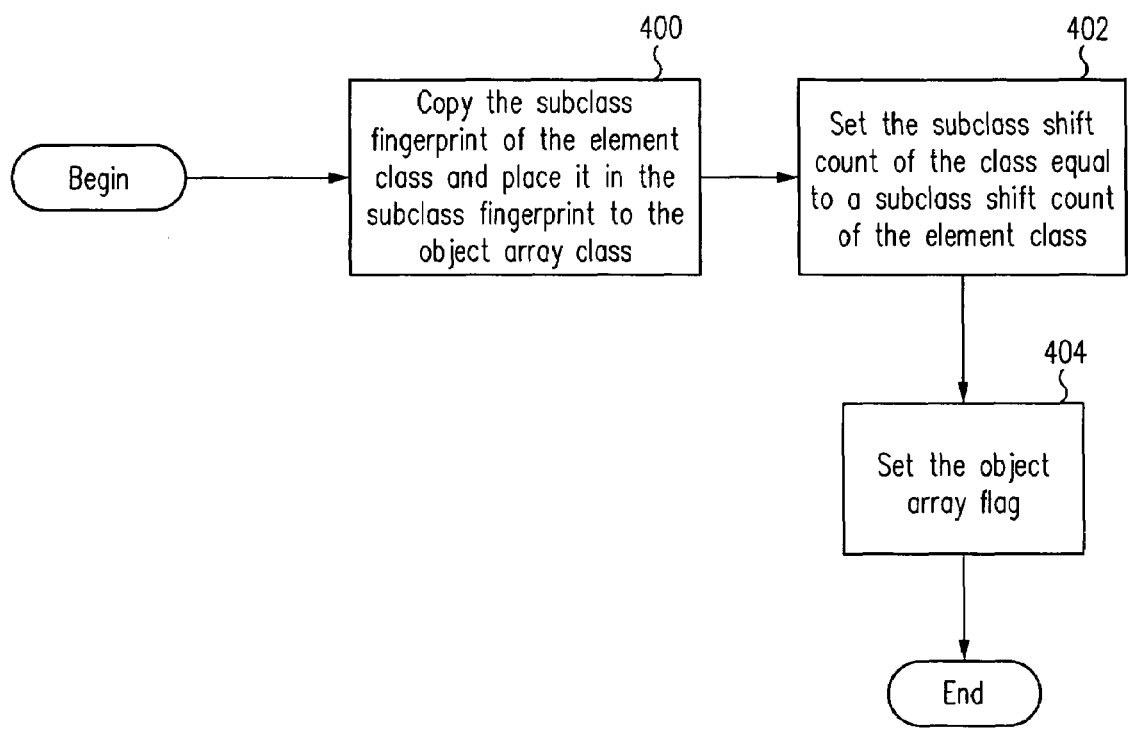
FIG. 4 is a flow diagram illustrating a method for loading an object array class in accordance with an embodiment of the present invention.

FIG. 4 is a flow diagram illustrating a method for loading an object array class in accordance with an embodiment of the present invention. At 400, the subclass fingerprint of the element class (which is located somewhere else in the hierarchy) is copied and placed in the subclass fingerprint of the object array class. At 402, the subclass shift count of the class may be set equal to the subclass shift count of the element class. At 404, the object array flag may be set.

Figure 5:
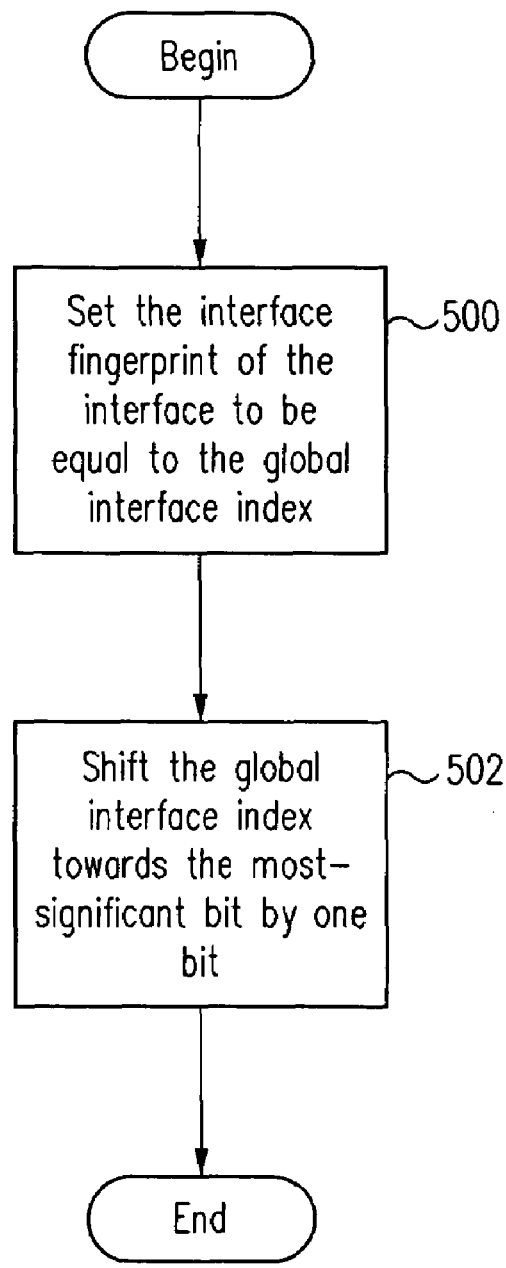
FIG. 5 is a flow diagram illustrating a method for loading an interface in accordance with an embodiment of the present invention.

FIG. 5 is a flow diagram illustrating a method for loading an interface in accordance with an embodiment of the present invention. At 500, the interface fingerprint of the interface may be set equal to the global interface index. Then, at 502, the global interface index may be shifted towards the most-significant bit by one bit (i.e., multiplying by 2).

If for some reason it is not possible to assign a valid subclass or interface fingerprint during execution of any of these methods, the fingerprints may be set to a specific value, such as 0xffffffff, which indicates as such. Examples of this include if a class has too many subclasses, or is too deep in the hierarchy, or if the global interface index overflows.

Figure 6:
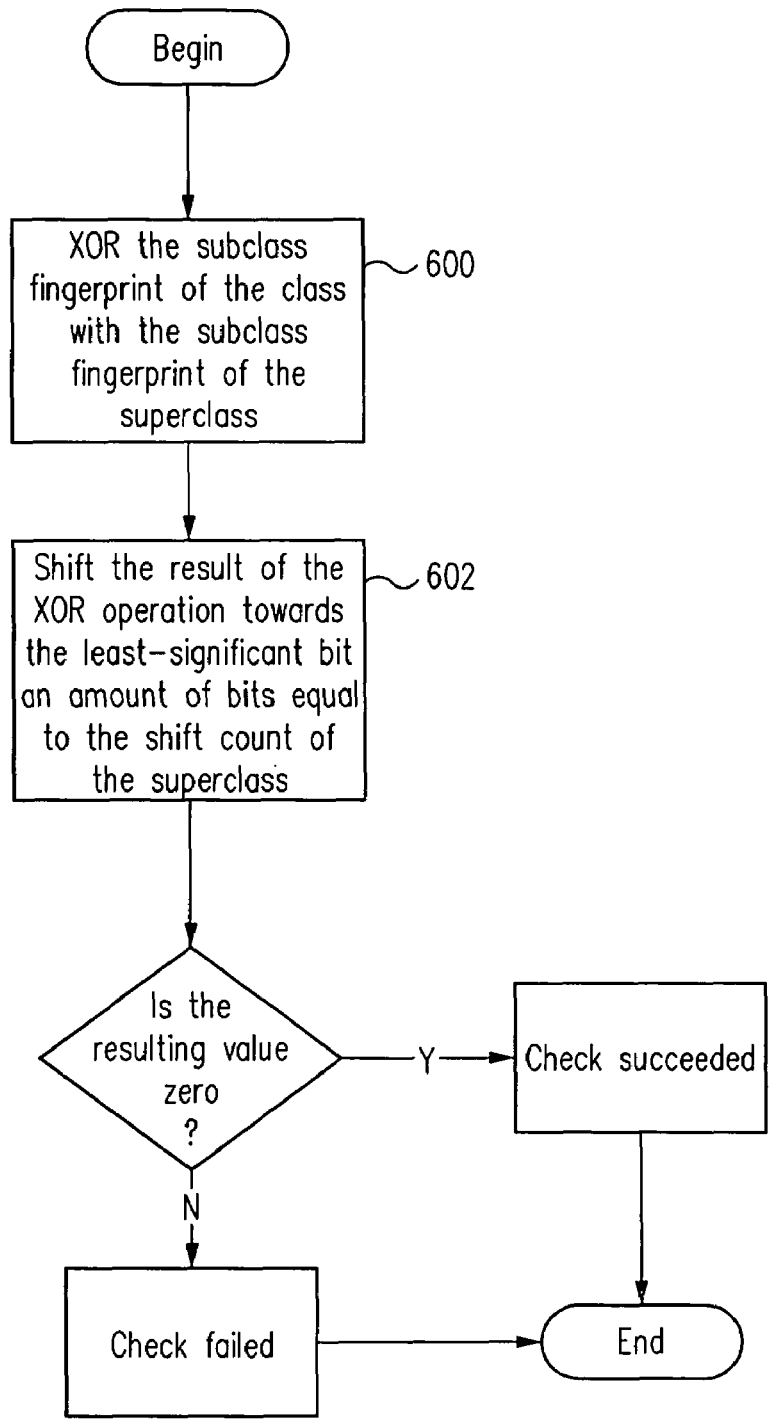
FIG. 6 is a flow diagram illustrating a method for checking the class of an instance against a possible superclass in accordance with an embodiment of the present invention.

FIG. 6 is a flow diagram illustrating a method for checking the class of an instance against a possible superclass in accordance with an embodiment of the present invention. At 600, the subclass fingerprint of the class may be XORed with the subclass fingerprint of the superclass. Then at 602, the result of the XOR operation may be shifted towards the least-significant bit an amount of bits equal to the shift count of the superclass. If the resulting value is 0, the subtype check succeeded, otherwise it failed. If either of the two is equal to the specific value described above with relation to impossible assignments of a fingerprint (e.g., 0xffffffff), then a slower sub-type check such as those described in the background section should be utilized.

Figure 7:
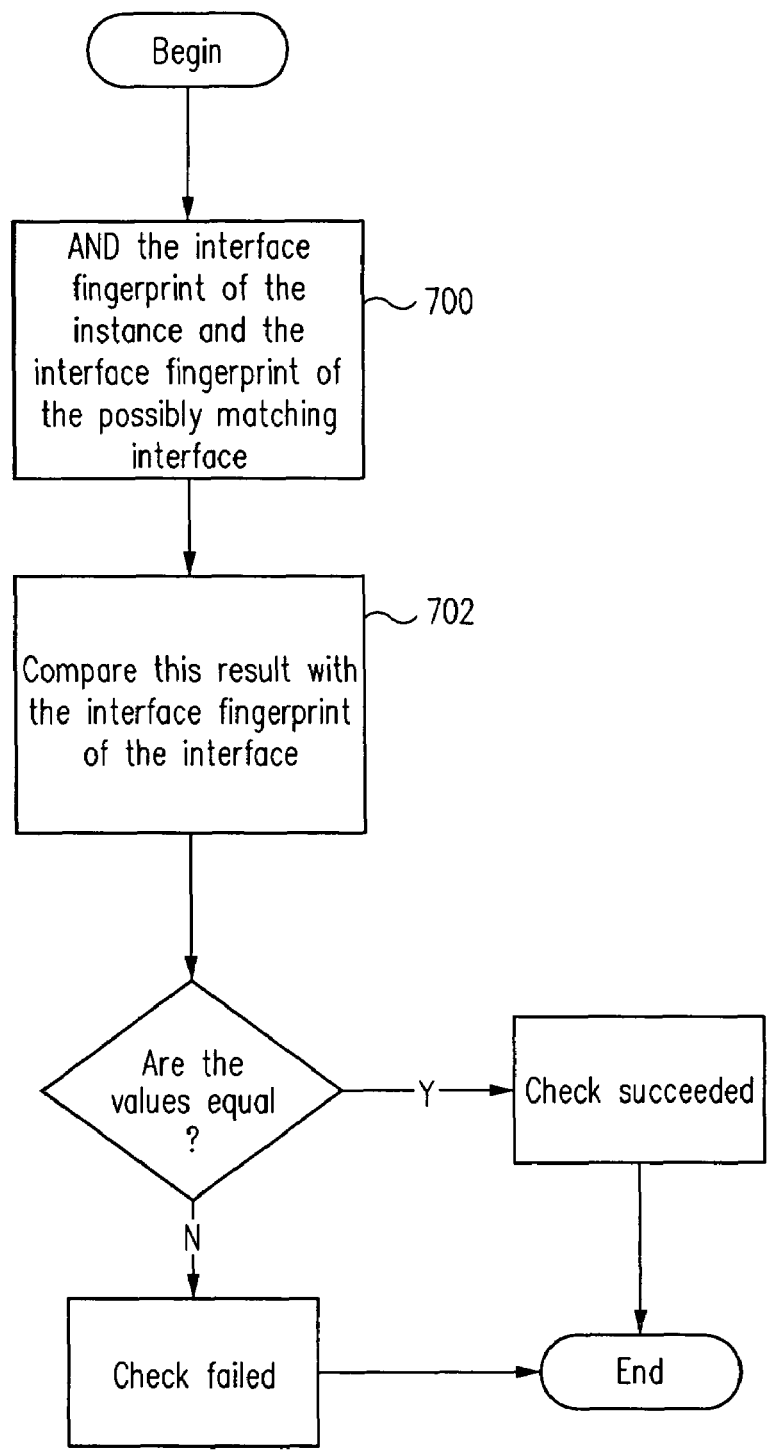
FIG. 7 is a flow diagram illustrating a method for checking the class of an instance against a possibly matching interface in accordance with an embodiment of the present invention.

FIG. 7 is a flow diagram illustrating a method for checking the class of an instance against a possibly matching interface in accordance with an embodiment of the present invention. At 700, the interface fingerprint of the instance and the interface fingerprint of the possibly matching interface may be ANDed. Then at 702, this result may be compared with the interface fingerprint of the interface. If they are equal, then the subtype check succeeded. Otherwise, it failed. Again, if either of the two fingerprints is equal to the specific value described above with relation to impossible assignments of a fingerprint (e.g., 0xffffffff), then a slower sub-type check such as those described in the background section should be utilized.

Figure 8:
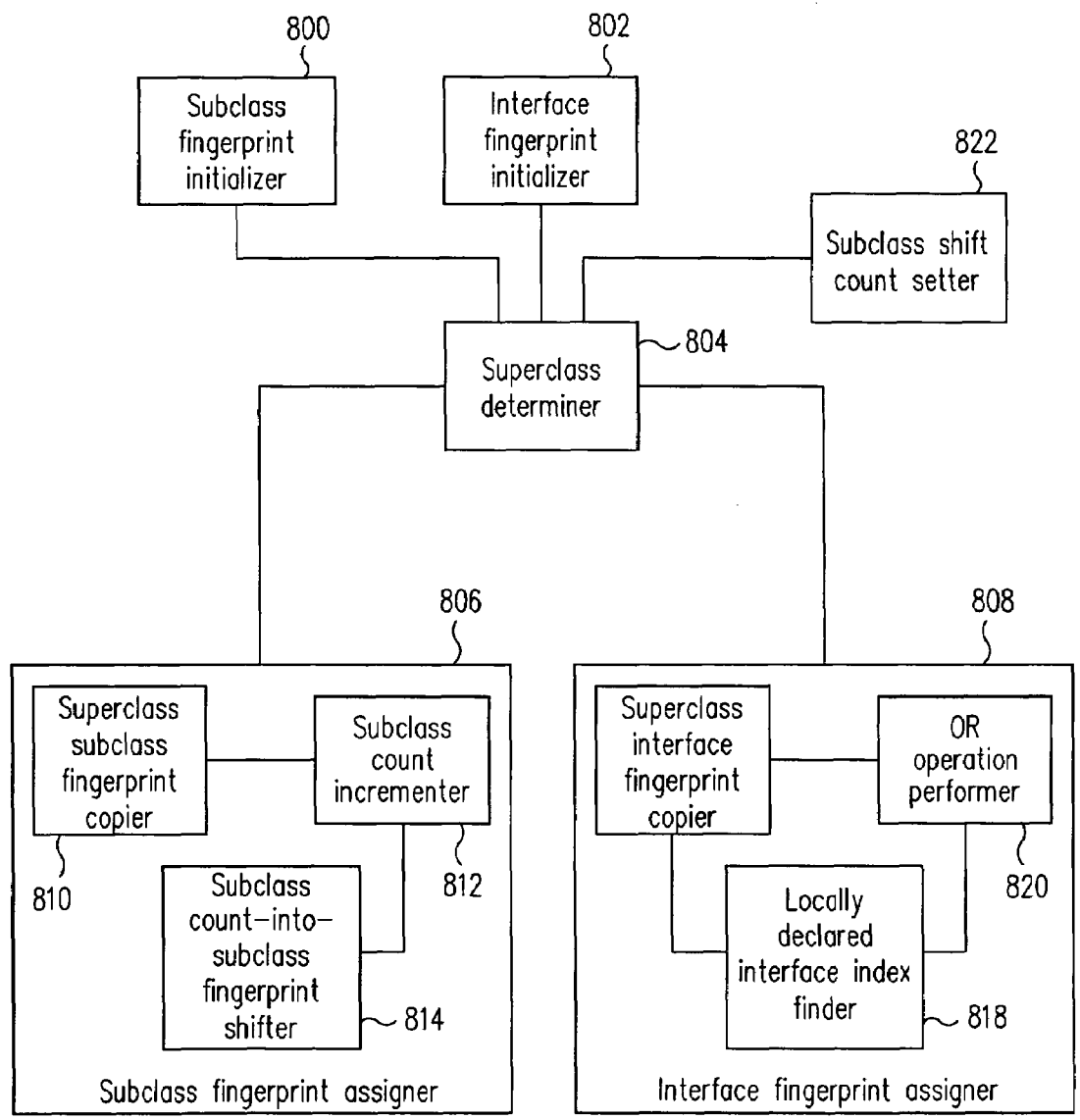
FIG. 8 is a block diagram illustrating an apparatus for loading a simple class in a virtual machine in accordance with an embodiment of the present invention.

FIG. 8 is a block diagram illustrating an apparatus for loading a simple class in a virtual machine in accordance with an embodiment of the present invention. A subclass fingerprint initializer 800 may initialize a subclass fingerprint and an interface fingerprint initializer 802 may initialize an interface fingerprint. A superclass determiner 804 coupled to the subclass fingerprint initializer 800 and to the interface fingerprint initializer 802 may determine if the simple class has a superclass (i.e., if the class is not the root class). If it does not have a superclass, then If, on the other hand, it does have a superclass, then a subclass fingerprint assigner 806 coupled to the superclass determiner 800 may copy the subclass fingerprint into the subclass fingerprint of the simple class, and an interface fingerprint assigner 808 coupled to said superclass determiner 804 may copy the interface fingerprint of the superclass into the interface fingerprint of the simple class.

The subclass fingerprint assigner 806 may include a superclass subclass fingerprint copier 810, which performs the copying of the subclass fingerprint. It may also include a subclass count incrementer 812 coupled to the superclass subclass fingerprint copier 810, which may increment the subclass count of the superclass. It may also include a subclass count-into-subclass fingerprint shifter 814 coupled to the subclass count incrementer 812 that may shift the newly incremented subclass count of the superclass into the subclass fingerprint of the simple class. In the embodiment described in FIG. 1 and the accompanying text, if the superclass is not java.lang.Object, the shifting involves finding the first empty index field and then performing an OR operation with the subclass count of the superclass into that empty index field. The number of bits may be fixed according to how the subclass fingerprint is organized. The first empty subclass index field may be determined by comparing a bit mask that is the same size as each index field (e.g., four bits) and performing an AND operation between the bit mask and the first index field. This may require that the bit mask be shifted down by the size of the index field (e.g., four bits) each time this comparison is made. If the result is zero, then the index field is empty. If not, the AND operation may be repeated with the next index field. This may continue until an empty index field is found or there are no more index fields. If the latter occurs, the fingerprint may be initialized to a special value, such as 0xffffffff.

The subclass interface assigner 808 may include a superclass interface fingerprint copier 816, which performs the copying of the interface fingerprint. It may also include a locally declared interface index finder 818, which may iterate through the list of locally declared interfaces for the simple class, finding each's interface index. An OR operation performer 820 coupled to the superclass interface fingerprint copier 816 and to the locally declared interface index finger 818 may then perform a logical OR of each interface index into the interface fingerprint.

A subclass shift count setter 822 coupled to the superclass determiner 804 may set a subclass shift count for the simple class equal to the number of unused bits in a subclass index portion of the subclass fingerprint.

Figure 9:
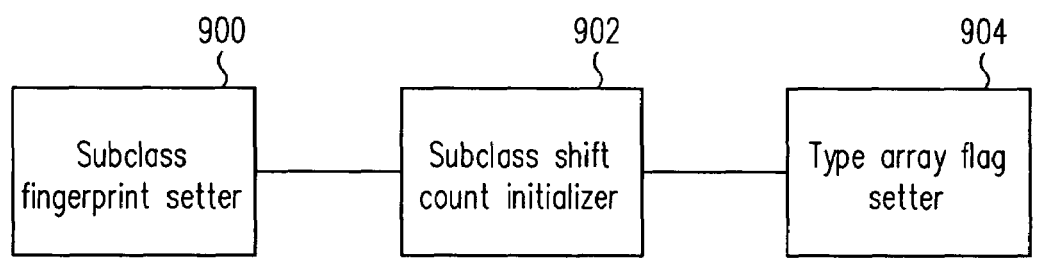
FIG. 9 is a block diagram illustrating an apparatus for loading a type array class in a virtual machine in accordance with an embodiment of the present invention.

FIG. 9 is a block diagram illustrating an apparatus for loading a type array class in a virtual machine in accordance with an embodiment of the present invention. A subclass fingerprint setter 900 may set the subclass fingerprint of the type array class to the type id of the element type of the array. Each primitive variable type (e.g., integer, floating point, etc.) has a unique type id, and this may be used as the subclass fingerprint. A subclass shift count initializer 902 coupled to the subclass fingerprint setter 900 may initialize the subclass shift count of the type array class to zero. A type array flag setter 904 coupled to the subclass shift count initializer 902 may set the type array flag.

Figure 10:
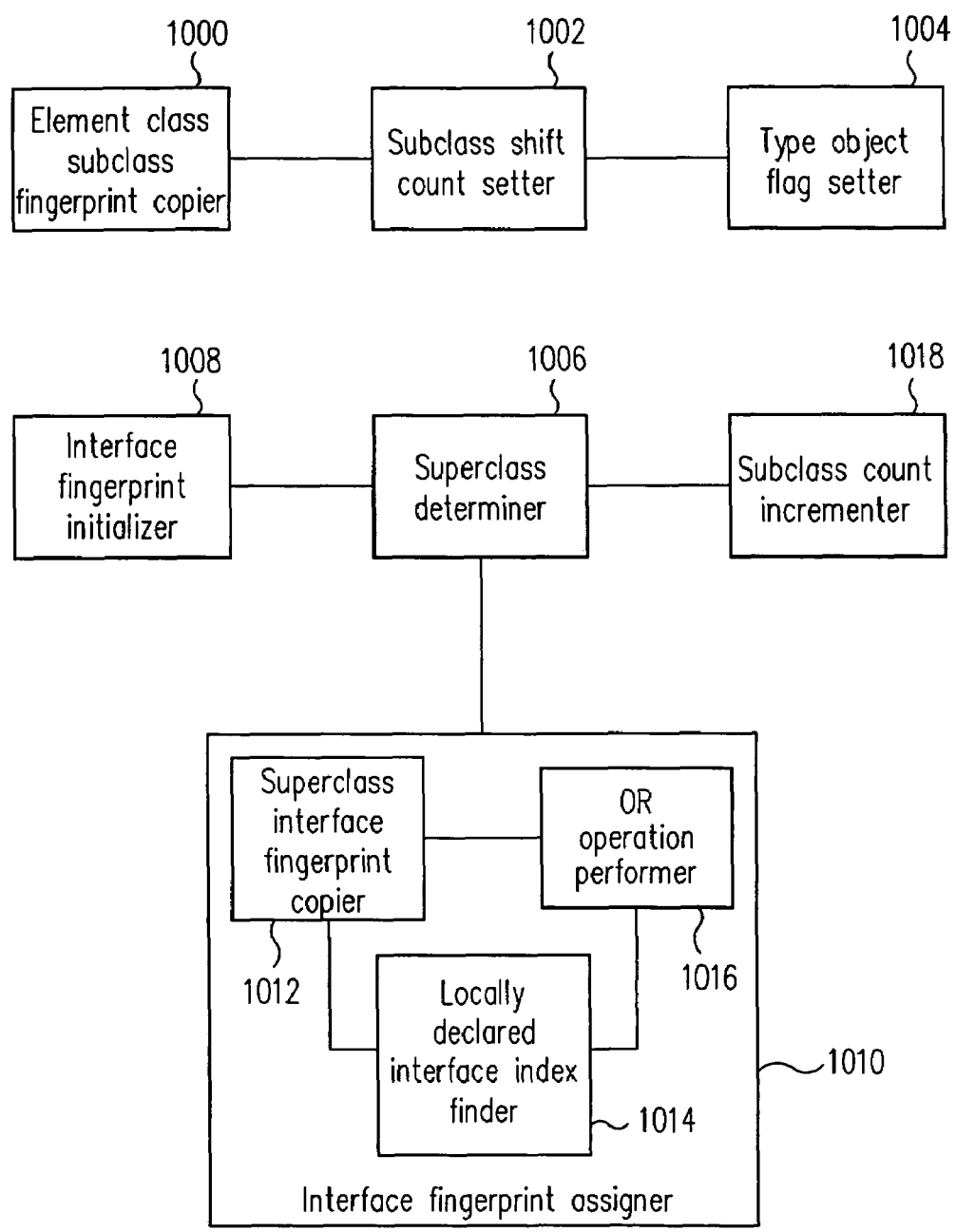
FIG. 10 is a block diagram illustrating an apparatus for loading an object array class in a virtual machine in accordance with an embodiment of the present invention.

FIG. 10 is a block diagram illustrating an apparatus for loading an object array class in a virtual machine in accordance with an embodiment of the present invention. An element class subclass fingerprint copier 1000 may copy the subclass fingerprint of the element class (which is located somewhere else in the hierarchy) and place it in the subclass fingerprint of the object array class. A subclass shift count setter 1002 coupled to the element class subclass fingerprint copier 1000 may set the subclass shift count of the object array class to be equal to the subclass shift count of the element class. An object array flag setter 1004 coupled to the subclass shift count setter 1002 may set the object array flag.

Figure 11:
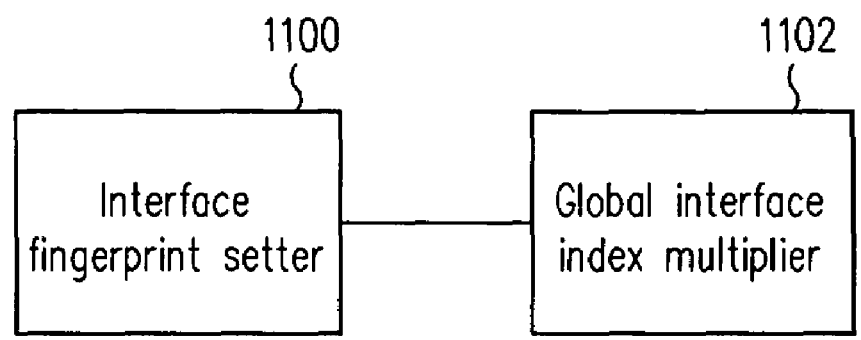
FIG. 11 is a block diagram illustrating an apparatus for loading an interface in accordance with an embodiment of the present invention.

FIG. 11 is a block diagram illustrating an apparatus for loading an interface in accordance with an embodiment of the present invention. An interface fingerprint setter 1100 may set the interface fingerprint of the interface equal to the global interface index. A global interface index shifter 1102 coupled to the interface fingerprint setter 1100 may then shift the global interface index towards the most-significant bit by one bit (i.e., multiply by 2).

If for some reason it is not possible to assign a valid subclass or interface fingerprint during execution of any of these methods, the fingerprints may be set to a specific value, such as 0xffffffff, which indicates as such. Examples of this include if a class has too many subclasses, or is too deep in the hierarchy, or if the global interface index overflows.

Figure 12:
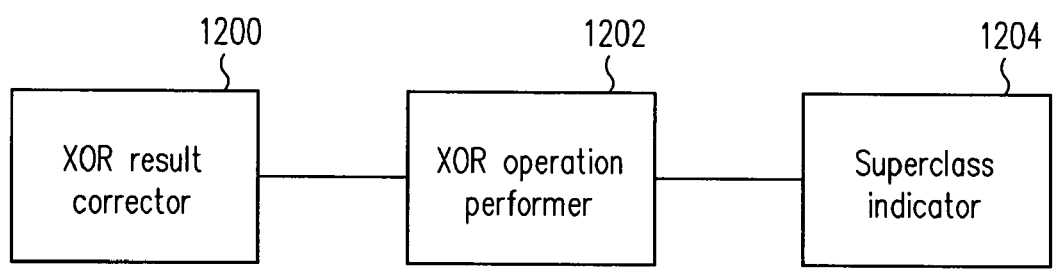
FIG. 12 is a block diagram illustrating an apparatus for checking the class of an instance against a possible superclass in accordance with an embodiment of the present invention.

FIG. 12 is a block diagram illustrating an apparatus for checking the class of an instance against a possible superclass in accordance with an embodiment of the present invention. An XOR operation performer 1200 may then XOR the subclass fingerprint of the class with the subclass fingerprint of the superclass. An XOR result corrector 1202 coupled to the XOR operation performer 1200 may correct the result of the XOR operation for the depth of the class. This may include shifting it towards the least-significant bit an amount of bits equal to the shift count of the superclass. If the resulting value is 0, the subtype check succeeded, otherwise it failed. A superclass indicator 1204 coupled to the XOR operation performer 1202 may be indicate as such. If either of the two fingerprints is equal to the specific value described above with relation to impossible assignments of a fingerprint (e.g., 0xffffffff), then a slower sub-type check such as those described in the background section should be utilized.

Figure 13:
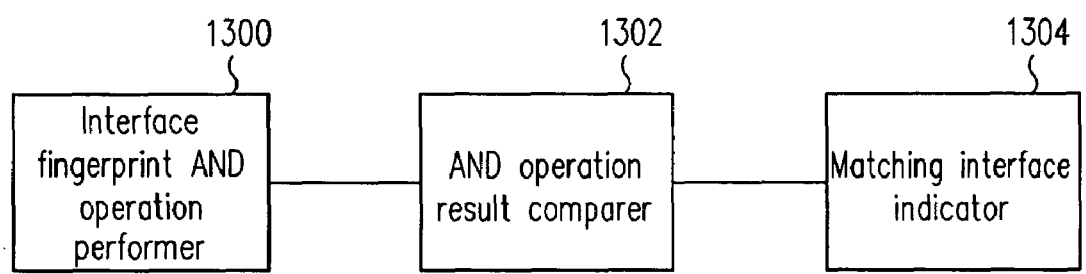
FIG. 13 is a block diagram illustrating an apparatus for checking the class of an instance against a possibly matching interface in accordance with an embodiment of the present invention.

FIG. 13 is a block diagram illustrating an apparatus for checking the class of an instance against a possibly matching interface in accordance with an embodiment of the present invention. An interface fingerprint AND operation performer 1300 may AND the interface fingerprint of the instance and the interface fingerprint of the possibly matching interface. An AND operation result comparer 1302 coupled to the interface fingerprint AND operation performer 1300 may then compare this result with the interface fingerprint of the interface. If they are equal, then the subtype check succeeded. Otherwise, it failed. A matching interface indicator 1304 coupled to the AND operation result comparer 1302 may indicate as such. Again, if either of the two fingerprints is equal to the specific value described above with relation to impossible assignments of a fingerprint (e.g., 0xffffffff), then a slower sub-type check such as those described in the background section should be utilized.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for loading a simple class in a virtual machine, comprising:
   determining if the simple class has a superclass;
   if the simple class has a superclass, assigning a subclass fingerprint for the simple class, said subclass fingerprint being unique within said virtual machine and parsable to determine a subclass fingerprint for any superclasses of the simple class; and
   if the simple class does not have a superclass, initializing a subclass fingerprint for the simple class;
   wherein said assigning includes:
      copying a subclass fingerprint from said superclass into a subclass fingerprint for the simple class;
      incrementing a subclass count of said superclass; and
      shifting said incremented subclass count of said superclass into the subclass fingerprint for the simple class.

2. The method of claim 1, wherein said shifting includes:
   finding a first empty subclass index field in said subclass fingerprint; and
   performing an OR operation of said subclass count of said superclass into said first empty subclass index field of the simple class.

3. The method of claim 2, further comprising:
   setting a subclass shift count of the simple class equal to a number of unused memory locations in a subclass index portion of said subclass fingerprint.

4. The method of claim 1, wherein said copying comprises:
   copying a subclass fingerprint from said superclass into a java.lang.Object subclass index of a subclass fingerprint in the simple class if said superclass is java.lang.Object; and
   copying a subclass fingerprint from said superclass into a subclass index portion of a subclass fingerprint in the simple class if said superclass is not java.lang.Object.

5. A method for loading a simple class in a virtual machine, comprising:
   determining if the simple class has a superclass;
   if the simple class has a superclass, assigning an interface fingerprint for the simple class, said interface fingerprint being parsable to determine locally declared interfaces for the simple class and any superclasses of the simple class; and
   if the simple class does not have a superclass, initializing an interface fingerprint for the simple class;
   wherein said assigning includes:
      copying an interface fingerprint from said superclass into an interface fingerprint for the simple class;
      finding an interface index for each locally declared interface of the simple class, the interface index being unique for each interface in said virtual machine; and
      performing an OR operation of each found interface index into said copied interface fingerprint.

6. The method of claim 5, wherein each interface index is separate from its closest interface index by two, and wherein a first interface index in the virtual machine is assigned a binary one.

7. A method for loading a simple class in a virtual machine, comprising:
   determining if the simple class has a superclass;
   if the simple class has a superclass:
      assigning a subclass fingerprint for the simple class, said subclass fingerprint being unique within said virtual machine and parsable to determine a subclass fingerprint for any superclasses of the simple class;
      assigning an interface fingerprint for the simple class, said interface fingerprint being parsable to determine locally declared interfaces for the simple class and any superclasses of the simple class;
   if the simple class does not have a superclass:
      initializing a subclass fingerprint for the simple class; and
      initializing an interface fingerprint for the simple class;
   wherein said assigning a subclass fingerprint includes:
      copying a subclass fingerprint from said superclass into a subclass fingerprint for the simple class;
      incrementing a subclass count of said superclass; and
      shifting said incremented subclass count of said superclass into the subclass fingerprint for the simple class.

8. The method of claim 7, wherein said shifting includes:
   finding a first empty subclass index field in said subclass fingerprint; and
   performing an OR operation of said subclass count of said superclass into said first empty subclass index field of the simple class.

9. The method of claim 8, further comprising:
   setting a subclass shift count of the simple class equal to a number of unused memory locations in a subclass index portion of said subclass fingerprint.

10. The method of claim 7, wherein said copying comprises:
    copying a subclass fingerprint from said superclass into a java.lang.Object subclass index of a subclass fingerprint in the simple class if said superclass is java.lang.Object; and
    copying a subclass fingerprint from said superclass into a subclass index portion of a subclass fingerprint in the simple class if said superclass is not java.lang.Object.

11. The method of claim 10, wherein said assigning an interface fingerprint includes:
    copying an interface fingerprint from said superclass into an interface fingerprint for the simple class;
    finding an interface index for each locally declared interface of the simple class, the interface index being unique for each interface in said virtual machine; and
    performing an OR operation of each found interface index into said copied interface fingerprint.

12. The method of claim 11, wherein each interface index is separate from its closest interface index by two, and wherein a first interface index in the virtual machine is assigned a binary one.

13. An apparatus for loading a simple class in a virtual machine, comprising:
    means for determining if the simple class has a superclass;
    means for, if the simple class has a superclass, assigning a subclass fingerprint for the simple class, said subclass fingerprint being unique within said virtual machine and parsable to determine a subclass fingerprint for any superclasses of the simple class; and
    means for, if the simple class does not have a superclass, initializing a subclass fingerprint for the simple class;
    wherein said means for assigning includes:
       means for copying a subclass fingerprint from said superclass into a subclass fingerprint for the simple class;
       means for incrementing a subclass count of said superclass; and
       means for shifting said incremented subclass count of said superclass into the subclass fingerprint for the simple class.

14. The apparatus of claim 13, wherein said means for shifting includes:
    means for finding a first empty subclass index field in said subclass fingerprint; and
    means for performing an OR operation of said subclass count of said superclass into said first empty subclass index field of the simple class.

15. The apparatus of claim 14, further comprising:
    means for setting a subclass shift count of the simple class equal to a number of unused memory locations in a subclass index portion of said subclass fingerprint.

16. The apparatus of claim 15, wherein said means for copying comprises:
    means for copying a subclass fingerprint from said superclass into a java.lang.Object subclass index of a subclass fingerprint in the simple class if said superclass is java.lang.Object; and
    means for copying a subclass fingerprint from said superclass into a subclass index portion of a subclass fingerprint in the simple class if said superclass is not java.lang.Object.

17. An apparatus for loading a simple class in a virtual machine, comprising:
    means for determining if the simple class has a superclass;
    means for, if the simple class has a superclass, assigning an interface fingerprint for the simple class, said interface fingerprint being parsable to determine locally declared interfaces for the simple class and any superclasses of the simple class; and
    means for, if the simple class does not have a superclass, initializing an interface fingerprint for the simple class;
    wherein said means for assigning includes:
       means for copying an interface fingerprint from said superclass into an interface fingerprint for the simple class;
       means for finding an interface index for each locally declared interface of the simple class, the interface index being unique for each interface in said virtual machine; and
       means for performing an OR operation of each found interface index into said copied interface fingerprint.

18. The apparatus of claim 17, wherein each interface index is separate from its closest interface index by two, and wherein a first interface index in the virtual machine is assigned a binary one.

19. An apparatus for loading a simple class in a virtual machine, comprising:
    means for determining if the simple class has a superclass;
    if the simple class has a superclass:
       means for assigning a subclass fingerprint for the simple class, said subclass fingerprint being unique within said virtual machine and parsable to determine a subclass fingerprint for any superclasses of the simple class;
       means for assigning an interface fingerprint for the simple class, said interface fingerprint being parsable to determine locally declared interfaces for the simple class and any superclasses of the simple class;

if the simple class does not have a superclass:
   means for initializing a subclass fingerprint for the simple class; and
   means for initializing an interface fingerprint for the simple class;
wherein said means f or assigning a subclass fingerprint includes:
   means for copying a subclass fingerprint from said superclass into a subclass fingerprint for the simple class;
   means for incrementing a subclass count of said superclass; and
   means for shifting said incremented subclass count of said superclass into the subclass fingerprint for the simple class.

20. The apparatus of claim 19, wherein said means for shifting includes:
   means for finding a first empty subclass index field in said subclass fingerprint; and
   means for performing an OR operation of said subclass count of said superclass into said first empty subclass index field of the simple class.

21. The apparatus of claim 20, further comprising:
   means for setting a subclass shift count of the simple class equal to a number of unused memory locations in a subclass index portion of said subclass fingerprint.

22. The apparatus of claim 19, wherein said means for copying comprises:
   means for copying a subclass fingerprint from said superclass into a java.lang.Object subclass index of a subclass fingerprint in the simple class if said superclass is java.lang.Object; and
   means for copying a subclass fingerprint from said superclass into a subclass index portion of a subclass fingerprint in the simple class if said superclass is not Java.lang.Object.

23. The apparatus of claim 22, wherein said means for assigning an interface fingerprint includes:
   means for copying an interface fingerprint from said superclass into an interface fingerprint for the simple class;
   means for finding an interface index for each locally declared interface of the simple class, the interface index being unique for each interface in said virtual machine; and
   means for performing an OR operation of each found interface index into said copied interface fingerprint.

24. The apparatus of claim 23, wherein each interface index is separate from its closest interface index by two, and wherein a first interface index in the virtual machine is assigned a binary one.

* * * * *

UNITED STATES PATENT AND TRADEMARK OFFICE
CERTIFICATE OF CORRECTION

| | | |
|---|---|---|
| PATENT NO. | : 7,216,333 B2 | Page 1 of 1 |
| APPLICATION NO. | : 10/410020 | |
| DATED | : May 8, 2007 | |
| INVENTOR(S) | : Kay A. Neuenhofen | |

It is certified that error appears in the above-identified patent and that said Letters Patent is hereby corrected as shown below:

In Column 10, Claim 16, Line 21, replace "claim 15" with --claim 13--.
In Column 11, Claim 19, Line 6, replace "f or" with --for--.

Signed and Sealed this

Third Day of July, 2007

JON W. DUDAS
*Director of the United States Patent and Trademark Office*